United States Patent
Ducos et al.

(10) Patent No.: US 7,426,983 B2
(45) Date of Patent: Sep. 23, 2008

(54) LANDING GEAR STRUT DAMPER, AND LANDING GEAR WITH INDEPENDENT STRUTS COMPRISING SAME

(75) Inventors: Dominique Ducos, Savigny-sur-Orge (FR); Jean-François Locufier, Rambouillet (FR); Ian Bennett, Cheltenham (GB); David Smart, Cheltenham (GB)

(73) Assignee: Messier-Dowty SA, Velizy Villacoublay (FR)

( * ) Notice: Subject to any disclaimer, the term of this patent is extended or adjusted under 35 U.S.C. 154(b) by 375 days.

(21) Appl. No.: 10/541,948

(22) PCT Filed: Dec. 29, 2003

(86) PCT No.: PCT/FR03/03925

§ 371 (c)(1),
(2), (4) Date: Mar. 13, 2006

(87) PCT Pub. No.: WO2004/069653

PCT Pub. Date: Aug. 19, 2004

(65) Prior Publication Data

US 2006/0163427 A1    Jul. 27, 2006

(30) Foreign Application Priority Data

Jan. 10, 2003   (FR) .................................. 03 00229

(51) Int. Cl.
| F16F 9/06 | (2006.01) |
| F16F 9/46 | (2006.01) |
| F16F 9/58 | (2006.01) |
| F16F 9/49 | (2006.01) |
| F16F 9/14 | (2006.01) |
| F16F 5/00 | (2006.01) |
| B64C 25/10 | (2006.01) |
| B64C 25/58 | (2006.01) |

(52) U.S. Cl. ............... 188/297; 244/100 R; 244/102 R; 244/102 A; 244/102 SL; 244/102 SS; 244/103 R; 244/104 R; 244/104 FP; 188/322.21; 188/352; 188/266; 188/322.19; 188/299.1; 267/64.15; 267/64.26; 267/64.28

(58) Field of Classification Search ................. 188/297, 188/322.19, 322.21, 299.1, 266, 352; 267/64.15, 267/64.26, 64.28; 244/100 R, 102 R, 102 A, 244/102 SL, 102 SS, 103 R, 104 R, 104 FP
See application file for complete search history.

(56) References Cited

U.S. PATENT DOCUMENTS 7,007,891 B2 * 3/2006 Ducos et al. ............ 244/102 R

FOREIGN PATENT DOCUMENTS

| EP | 0614804 | 9/1994 |
| EP | 1332963 A1 * | 8/2003 |
| GB | 2057629 | 4/1981 |

* cited by examiner

Primary Examiner—John Q. Nguyen
Assistant Examiner—Stephen Brookman
(74) Attorney, Agent, or Firm—McCormick, Paulding & Huber LLP

(57) ABSTRACT

A damper for an airplane landing gear leg comprises a main strut (11) and a rod piston (13) co-operating with the strut (11) to define a main chamber (15) and annular chamber (16) for hydraulic fluid, and presenting internally two adjacent chambers (19, 20) that are isolated from each other by a separator piston (21). The damper (10) further comprises a first secondary strut (26) telescopically Slidable on the above-mentioned rod piston (13), and a second secondary strut (37) telescopically slidable on the other end of the first secondary strut (26). The two second annular chambers (31, 40) as defined in this way are respectively connected to associated control circuits thus enabling the total length of the damper to be shortened or lengthened respectively for the purpose of causing the landing gear to contract or to be extended.

8 Claims, 4 Drawing Sheets

LANDING GEAR STRUT DAMPER, AND LANDING GEAR WITH INDEPENDENT STRUTS COMPRISING SAME

CROSS-REFERENCE TO RELATED APPLICATIONS

This application is entitled to the benefit of International Application No. PCT/FR2003/003925 filed on Dec. 23, 2003, and French Patent Application No. 03/00229 filed on Jan. 10, 2003.

FIELD OF THE INVENTION

The present invention relates to a leg damper for airplane landing gear, and also to retractable landing gear of the vertically retractable type comprising a plurality of independent legs arranged one behind another, with each leg being fitted with such a damper.

BACKGROUND OF THE INVENTION

In certain situations, when an airplane is stationary or moving slowly on the ground, it is desired to be able to change the attitude of the airplane, i.e. the angle of inclination of its longitudinal axis and/or its transverse axis.

In document U.S. Pat. No. 5,310,140 in the name of the Applicant, an approach is described consisting in modifying the length of the nosegear without involving the main landing gear. The damper structure described in that document makes it easy to extend the nosegear while the airplane is stationary or moving slowly on the ground, without requiring the hydraulic generator of the airplane to be used, i.e. without it being necessary for the engines to be running.

Document U.S. Pat. No. 5,310,139 in the name of the Applicant describes a nosegear damper designed to perform the same function. Reference can also be made to document GB-A-2,057,629.

The present invention relates more to dampers fitted to vertically-retractable main landing gear for wide-bodied airplanes, comprising a plurality of independent legs arranged one behind another so as to form, in the gear-down position, a row that is parallel to the longitudinal plane of the airplane, with a pair of wheels being mounted at the end of each leg.

Such retractable landing gear for a wide-bodied airplane is described, for example, in documents EP-A-0,676,328 and EP-A-0,614,804 in the name of the Applicant.

In other situations, it is desired to shorten one or more legs when the airplane is stationary or moving slowly on the ground. Such shortening can be advantageous, not only when it is desired to change the attitude of the airplane when stationary, in particular while loading the airplane, but also in other particular situations such as changing a tire or unloading the front leg in order to make turning operations easier. For tire changing it is conventional to use jack systems enabling the structure of the airplane to be raised so as to disengage the tire for changing from its contact with the ground.

OBJECTS AND SUMMARY OF THE INVENTION

An object of the invention is to devise a landing gear damper capable of combining both the functions of lengthening and of shortening the landing gear leg fitted with the damper, and more particularly a damper capable of providing a very long contraction stroke in order to enable the airplane to be loaded regardless of the unevenness of the terrain concerned and regardless of the type of loading truck used, while guaranteeing attitude and ground clearance that are as good as possible.

To solve this problem, the invention provides a damper for an airplane landing gear leg, the damper being of the type comprising a main strut and a rod-piston having one end mounted to slide in said main strut along the axis thereof, said rod-piston co-operating with the main strut to define a main hydraulic fluid chamber and an annular hydraulic fluid chamber communicating with said main chamber via an associated diaphragm, and said rod-piston presenting internally two adjacent chambers isolated from each other by a separator piston, one of the adjacent chambers being a hydraulic fluid chamber which communicates with the main chamber via an associated diaphragm, and the other of the adjacent chambers being a pressurized gas chamber, said damper being remarkable in that it further comprises a first secondary strut having one end mounted to slide telescopically on the other end of the above-mentioned rod-piston, co-operating with the end wall of said rod-piston to define a first secondary hydraulic fluid chamber which is closed by an associated hydraulic locking member, and a first annular secondary hydraulic fluid chamber which is connected to an associated control circuit, thus enabling the total length of the damper to be shortened in order to allow the landing gear leg to contract, and a second secondary strut mounted to slide telescopically on the other end of the first secondary strut, co-operating with the end wall of said first secondary strut to define a second secondary hydraulic fluid chamber which is closed by an associated hydraulic locking member, and a second annular secondary hydraulic fluid chamber which is connected to an associated control circuit, thus enabling the total length of the damper to be lengthened in order to extend the landing gear leg.

Such a damper thus performs not only its conventional damping function, but also provides two positioning functions by having a contraction stroke and an extension stroke, thereby solving the problem posed.

Preferably, the first secondary hydraulic fluid chamber is separated from the pressurized gas chamber by an intermediate partition forming the end wall of the rod-piston. This arrangement makes it possible to have total independence between the shock absorber portion and the contraction portion, thus making it possible to avoid any risk of air and oil mixing, which risk is never completely avoided when using systems with gaskets that might leak.

Also advantageously, in the maximally-shortened position of said damper due to the rod-piston penetrating into the first secondary strut, said first secondary strut comes into abutment against the main strut, thereby guaranteeing predetermined ground clearance for the airplane in the maximally-contracted position of the corresponding landing gear legs. Such a positive abutment constitutes a very important safety measure which makes it certain that there will be no contact between the fairing of the airplane and the ground.

Also preferably, in the maximally-lengthened position of said damper due to the first secondary strut projecting out from the second secondary strut, an inside shoulder of said second secondary strut comes into abutment against an outside shoulder of said first secondary strut, thereby guaranteeing a constant extended position for the landing gear leg concerned.

It is also advantageous to provide for each of the control circuits associated with the first and second annular secondary hydraulic fluid chambers to include an individually-actuatable solenoid valve.

The invention also provides a retractable landing gear for an airplane of the vertically-retractable type, the landing gear comprising a plurality of legs arranged one behind another to form, in the gear-down position, a row that is parallel to the longitudinal midplane of the airplane, each leg comprising a structural part rigidly secured to an airplane structure, a rocker beam hinged to the bottom end of said structural part so that said rocker beam is movable in a vertical plane together with its pair of wheels, and a damper interposed between an appendix of the rocker beam and at least one movable element forming part of the landing gear control rodding, said landing gear being remarkable in that the damper of each leg is a damper presenting at least one of the above-specified characteristics, enabling a pair of wheels to be raised or lowered selectively in order to cause said leg to contract or to be extended, while the airplane is stationary or moving slowly on the ground.

Preferably, the dampers of said landing gear have control circuits arranged to enable the lengthening or shortening of said dampers to be controlled either selectively and individually, or as a group.

Finally, and preferably, the dampers of said landing gear are dimensioned to guarantee predetermined ground clearance for the airplane in the maximally-sagged position of the legs in a given row, by means of an associated thrust abutment.

Other characteristics and advantages appear more clearly in the light of the following description relating to a particular embodiment.

BRIEF DESCRIPTION OF THE DRAWINGS

Reference is made to the figures of the accompanying drawings, in which.

DETAILED DESCRIPTION OF THE INVENTION

The structure of a damper in accordance with the invention is initially described with reference to FIG. 1.

Figure 1:
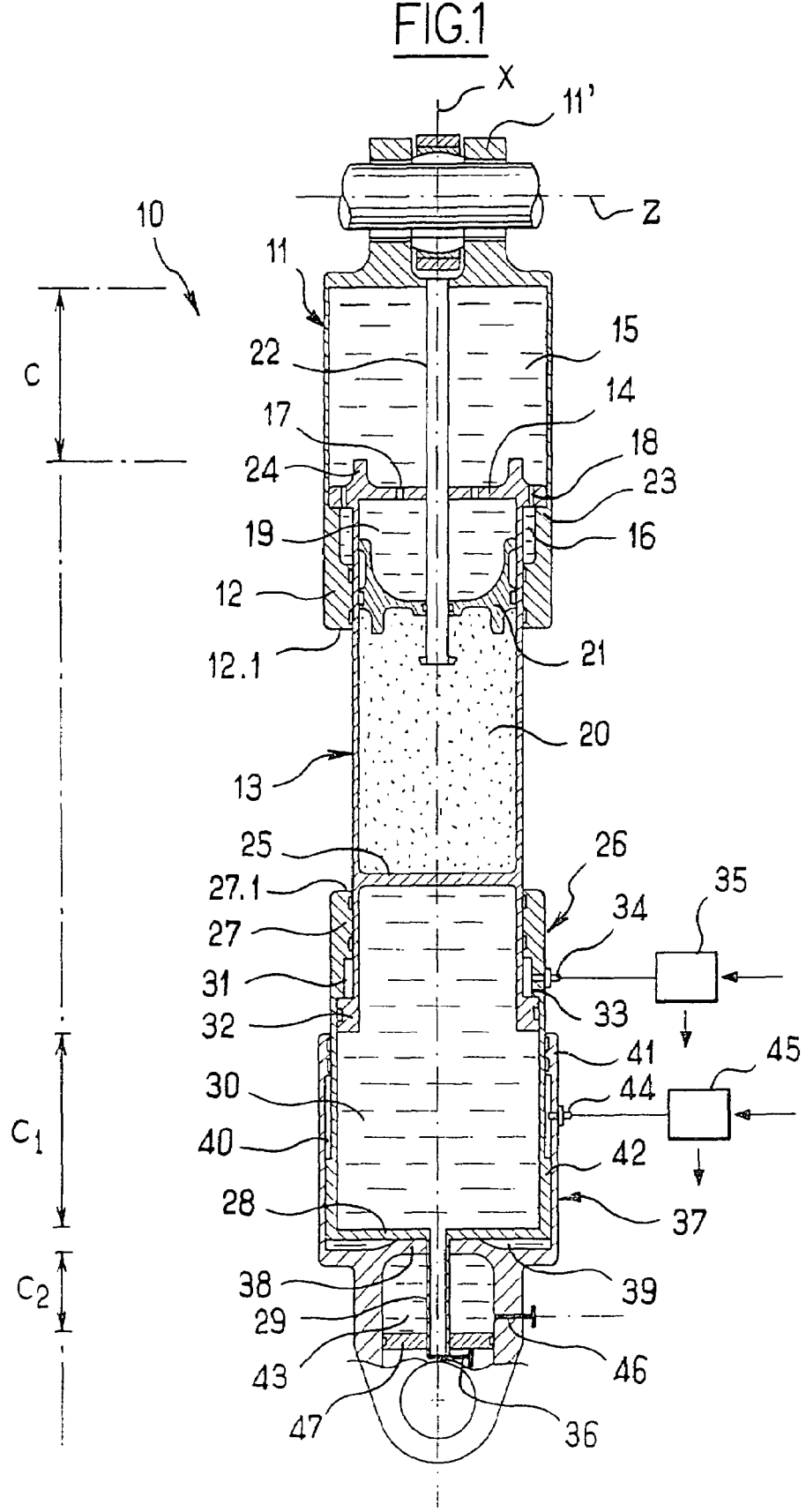
FIG. 1 is an axial section showing a damper in accordance with the invention.

The top portion (in the drawing, but not necessarily in reality) of the damper 10 shown in FIG. 1, is a portion that is dedicated to the conventional function of absorbing shock and vibration, and is of conventional structure. There can thus be seen a main strut 11 having lugs 11' for hinging it about an axis Z extending transversely to the longitudinal midplane of the airplane. The central axis of the damper 10 is referenced X. A rod-piston 13 is also provided, having a top end that slides in the main strut 11 along the axis X. The end wall 14 of the rod-piston 13 co-operates with the main strut 11 to define a main hydraulic fluid chamber 15, and an annular hydraulic fluid chamber 16 communicating with said main chamber via an associated diaphragm 18. The rod-piston 13 also presents internally two adjacent chambers 19 and 20 that are isolated from each other by a separator piston 21, comprising a hydraulic fluid chamber 19 communicating with the main chamber 15 via an associated diaphragm 17 formed in the transverse end wall 14 of the rod-piston 13, and a chamber 20 containing gas under pressure. The end in question of the rod-piston 13 thus slides telescopically in the enlarged bottom portion 12 of the main strut 11. The position shown corresponds to a maximally-extended position, in which the end wall 14 comes into abutment against an associated shoulder 23 of the main strut 11. The maximally-retracted position of the rod-piston 13 in the main strut 11 is given by protuberances 24 formed on the wall 14 coming into abutment against the top end of said main strut 11. A filler tube 22 is provided enabling the chamber 20 to be filled initially with gas under pressure. The pressurized gas chamber 20 is thus defined by the separator piston 21 at one end and by a transverse partition 25 constituting the end wall of the rod-piston 13.

The bottom portion of the damper 10 is described below, and it is this portion that is associated with a function of positioning the associated leg.

The rod-piston 13 continues beyond its end wall 25 so as to present an extension on which there slides another strut referenced 26, constituting a first secondary strut. This first secondary strut 26 thus has an enlarged end 27 which slides telescopically on the bottom end of the rod-piston 13, co-operating with the end wall 25 of said rod-piston to define a first secondary hydraulic fluid chamber 30. The first secondary strut 26 presents at its other end an end wall 28 co-operating with the end wall 25 to define the above-mentioned first secondary chamber 30. The secondary hydraulic fluid chamber 30 is closed by an associated hydraulic locking member 36 represented diagrammatically in the figure, specifically a member located at the end of a tubular extension 29 extending beyond the end wall 28 of the first secondary strut 26.

In addition, the top portion 27 of the first secondary strut 26 co-operates with the bottom portion 32 of the rod-piston 13 to define a first annular secondary hydraulic fluid chamber 31, which chamber is connected to an associated control circuit constituted by a communication valve 34 passing through the wall of the strut 26 and connected to a controlling solenoid valve 35.

Thus, by actuating the control valve 35, and the hydraulic lock 36, it is possible to act on the volume of said first annular secondary chamber 31, and consequently lengthen or shorten the damper. In practice, the intended purpose will be essentially to shorten the total length of the shock absorber 10 in order to contract the landing gear leg.

The damper 10 further comprises a second secondary strut 37 sliding telescopically on the other end of the first secondary strut 26, co-operating with the end wall 28 of said first secondary strut to define a second secondary hydraulic fluid chamber 39 which is closed by an associated hydraulic locking member 46, and a second annular secondary hydraulic fluid chamber 40 which is connected to an associated control circuit comprising a communication valve 44 passing through the wall of the strut 26 and connected to a controlling solenoid valve 45. The second annular secondary chamber 40 is thus defined between the top end 41 of the second secondary strut 37 and the bottom end of the first secondary strut 26.

By acting on the control valve 45, and the hydraulic lock 46, it is possible to act directly on the volume of said second annular secondary chamber 40, and consequently to cause the first secondary strut 26 to move relative to the second secondary strut 37. In practice, this function is associated with extending the landing gear leg due to the lengthening obtained in the total length of the damper.

For hydraulic locking, an auxiliary hydraulic fluid chamber 43 is provided that is defined at one end by the end wall 38 of the second secondary strut 37, and also by a transverse wall 47 secured to the tubular extension 29 of the first secondary strut 26. Naturally, any other type of arrangement could be used that serves to provide hydraulic locking, in particular for the purpose of preventing cavitation of the oil in the second secondary chamber 39.

In FIG. 1, reference c designates the damper stroke corresponding to the distance between the protuberances 24 and the top end wall of the main strut 11. Reference $C_1$ designates the maximum contraction stroke, corresponding to the stroke of the end 32 of the rod-piston 13 between the top shoulder 33 of the first secondary strut 26 and the end wall 28 of said first secondary strut. Reference $C_2$ designates the maximum extension stroke corresponding to the distance between the end wall 38 of the second secondary strut 37 and the end wall 47, or where appropriate to the distance between the end 41 of said second secondary strut 37 and the outside shoulder 42 formed on the first secondary strut 26.

As an indication, a damper for a wide-bodied airplane can be made that has a wheel center stroke of 600 millimeters (mm), a contraction stroke (which can also be referred to as a "kneeling" stroke) of 570 mm, and an extension stroke of 240 mm.

Such a three-function damper serves not only to perform the required damping function, which is performed in conventional manner, but also to perform two positioning functions for the purpose of contracting or extending the corresponding landing gear leg.

It should be observed that the first secondary hydraulic fluid chamber 30 is separated from the pressurized gas chamber 20 by an intermediate partition forming the end wall of the rod-piston 13. It can thus be seen that the first secondary hydraulic fluid chamber 30 and the main hydraulic fluid chamber 15 are completely separated from each other, thus making it possible to avoid any risk of influence between the hydraulic fluids used, with any leakage being impossible because of the presence of the partition 25 in the rod-piston 13. This makes it possible to avoid having gaskets with multiple compatibilities for the hydraulic fluids of the feed circuit and those of the damper.

Special dimensioning is also provided for the above-described damper.

In the position in which the damper 10 is maximally shortened due to the rod-piston 13 penetrating into the first secondary strut 26, provision is made for the first secondary strut 26 to come into abutment against the main strut 11. This means that the free edge 27.1 at the end 27 of the first secondary strut 26 comes into contact in this position with the free edge 12.1 at the end 12 of the main strut 11. This is most advantageous in practice insofar as such positive abutment makes it possible to guarantee predetermined ground clearance for the airplane when the landing gear legs concerned are in their maximally-contracted position. By means of this abutment contact, when the airplane is loaded, there is no risk of it sinking further, so the attitude of the airplane remains constant. Ground clearance is guaranteed, and it is quite certain that the fairing of the airplane will not come into contact with the ground when the airplane is fully loaded. Clearly in the absence of such an abutment, there would be a major risk of the wheel continuing to move closer to the airplane.

Finally, the maximally-lengthened position of the damper 10, due to the first secondary strut 26 projecting from the second secondary strut 37, causes the inside shoulder 41 of said second secondary strut to come into abutment against the outside shoulder 42 of said first secondary strut, thus guaranteeing a constant fully extended position for the landing gear leg in question.

Provision is preferably made for the control circuit associated with the first and second annular secondary hydraulic fluid chambers 31 and 40 to include respective solenoid valves 35 and 45 that can be actuated individually.

There follows a description of a main landing gear of the type comprising independent vertically-retractable legs, in which each leg is fitted with a damper of the type described above. This makes it easier to understand the numerous advantages presented by the damper structure of the invention, in various situations for the airplane fitted therewith, when stationary or taxiing on a runway.

Figure 2:
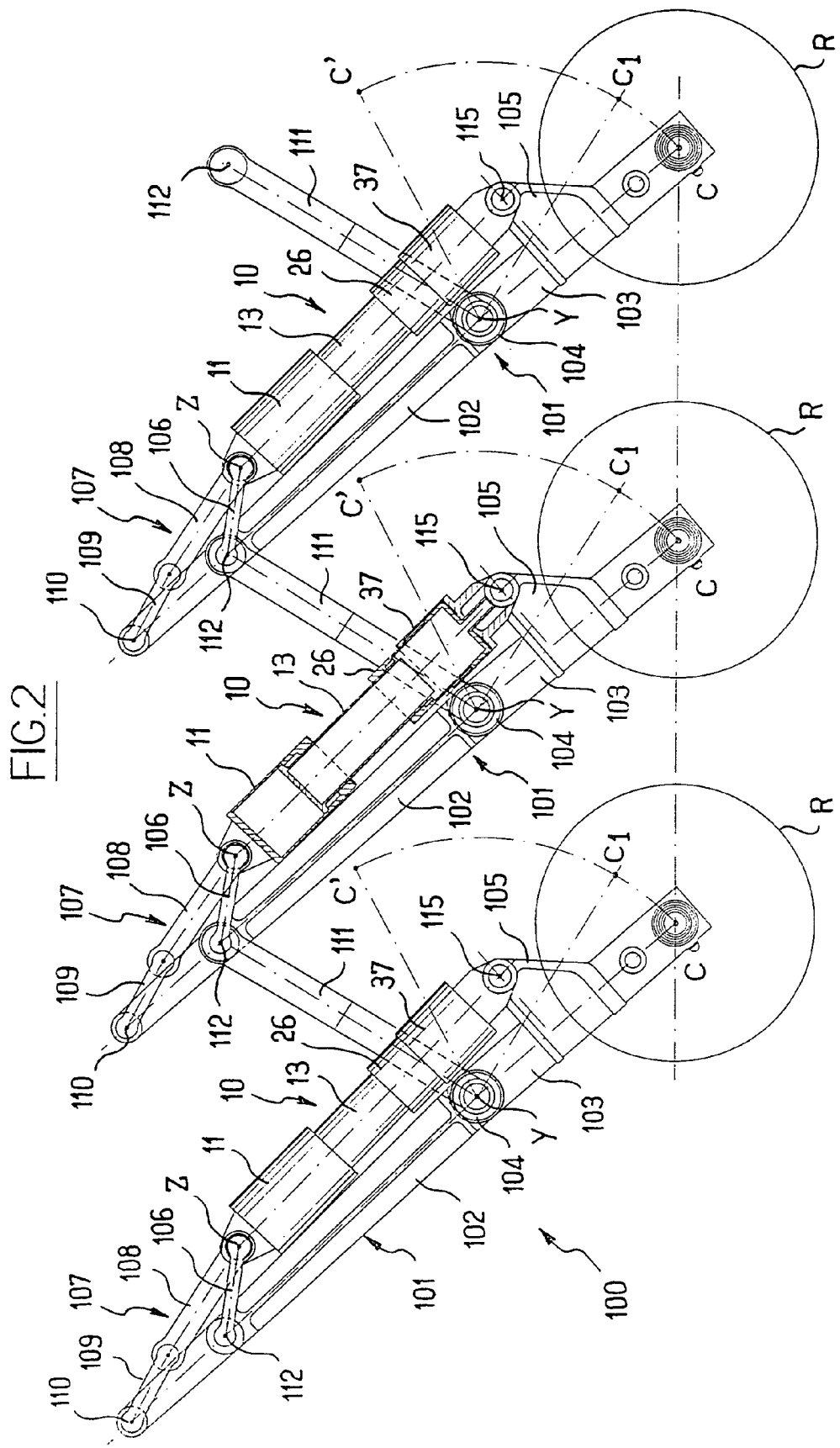
FIG. 2 shows landing gear comprising three independent legs, each of which is fitted with a damper of the type shown in FIG. 1, the landing gear being shown in the down position with three pairs of wheels all at the same level, and with the damper of the central leg being shown in section for greater clarity.

Thus, in FIG. 2, there can be seen landing gear 100 for a wide-bodied airplane, the landing gear being of the type that is retracted vertically and comprising a plurality of legs 101 arranged one behind another so that, in the gear-down position (as shown in FIG. 2), they form a row parallel to the longitudinal midplane of the airplane. Specifically, this main landing gear comprises three independent legs 101, but that is naturally merely an example. Each leg 101 has a structural part 102 rigidly secured to a structure of the airplane, and a rocker beam 103 hinged to the bottom end 104 of said structural part about a transverse axis Y. Each rocker beam 103 carrying a pair of wheels R can thus be moved in a vertical plane, by pivoting about the above-mentioned axis Y which is perpendicular to the longitudinal midplane of the airplane.

A damper 10 is also provided that is interposed between an intermediate appendix 105 of the rocker beam 103 and at least one movable element forming part of the rodding for controlling the landing gear 100. Specifically, provision is made for the top portion of the damper 10 to be hinged to a link 106, itself hinged at 112 to the structural part 102, being also connected to an alignment brace 107, constituted by two hinged-together arms 108 and 109, the top arm 109 also being hinged at 110 to the top portion of the structural part 102. Each leg 101 is also connected to an associated control actuator (not shown herein), e.g. by providing for the hinge of the retraction actuator rod to act on the axis Z. There also be seen panels 111 interconnecting the adjacent structural parts 102, each panel 111 being interposed between the bottom end 104 of the structural part and a high connection point 112 aligned on the connection with the link 106.

The position in FIG. 2 corresponds to a gear-down position, the dampers 10 being in the relaxed position (damper function in the relaxed position, and positioning function in the neutral position). In this position, the centers C of the wheels R are in a low position. When the airplane is in contact with the ground, the static load causes the rod-piston 13 to penetrate into the main strut 11 in entirely conventional manner, thereby bringing the centers C to $C_1$. The point C' is also shown which corresponds to the gear-retracted position. In the position shown in FIG. 2, it can be seen that the visible length of the rod-piston 13 is at a maximum.

Figure 3:
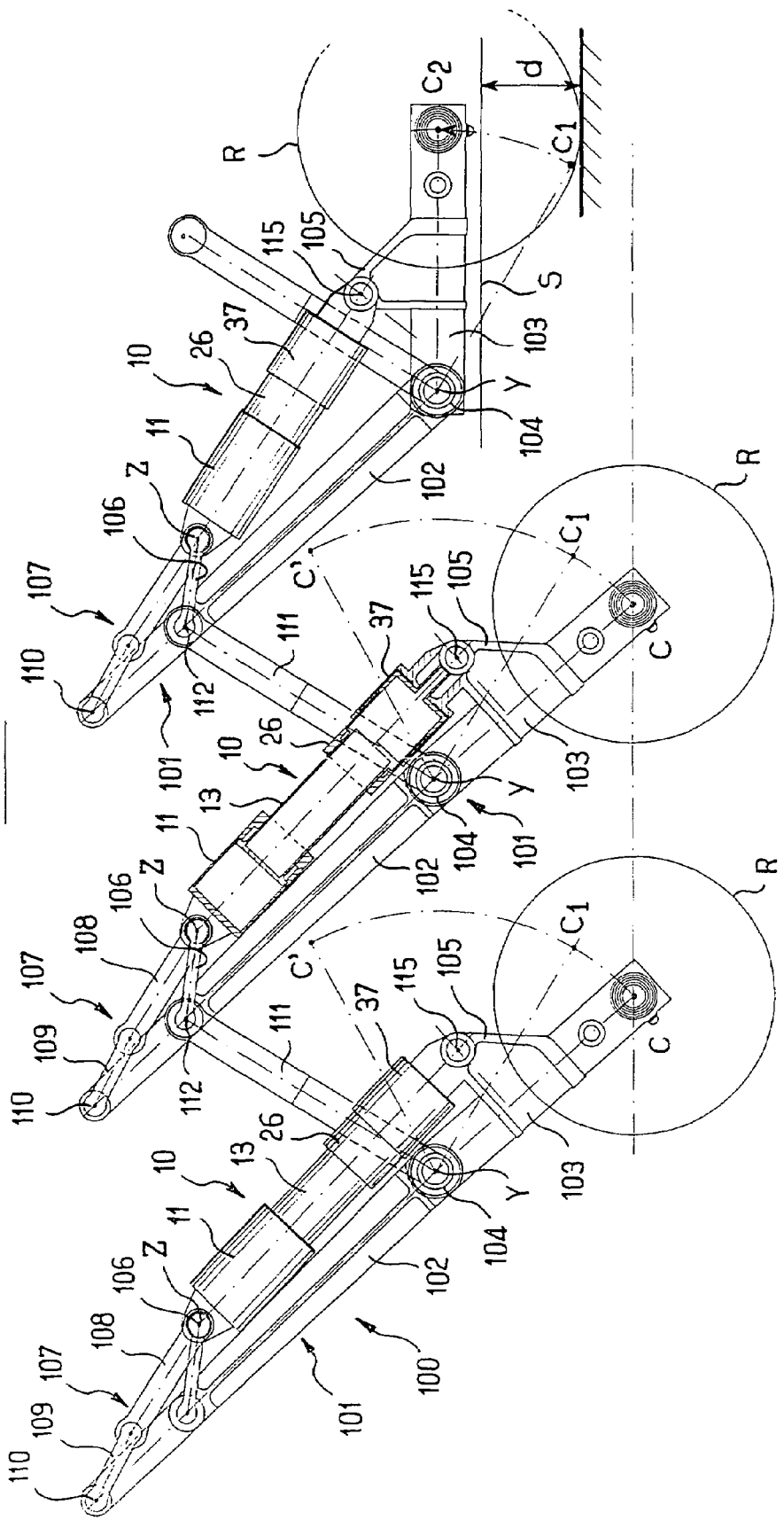
FIG. 3 is a view analogous to FIG. 2 and shows the damper of the rear leg shortened, so that the associated pair of wheels is raised relative to the other pairs of wheels, the position shown corresponding to a maximum degree of contraction, while maintaining predetermined ground clearance for the fairing of the airplane in this contracted position.

In FIG. 3, the leg that is nearest the tail has its damper 10 in its maximally-shortened position. In this position, the first secondary strut 26 comes into abutment against the main strut 11, so the above-mentioned rod-piston 13 can no longer be seen. This maximum-penetration position that is obtained by controlling the associated solenoid valve, corresponds to the damper 10 being in its maximally-shortened position, i.e. to the leg 101 concerned contracting to the maximum extent. In this maximally-contracted position, the centers of the wheels R pass from the point $C_1$ corresponding to the normal static load, to a higher point $C_2$. In this position as shown, the distance between the ground and the bottom edge of the fairing S of the airplane is referenced d. This distance d corresponds to predetermined ground clearance which is guaranteed in this configuration by the struts 11 and 26 coming into abutting contact.

Figure 4:
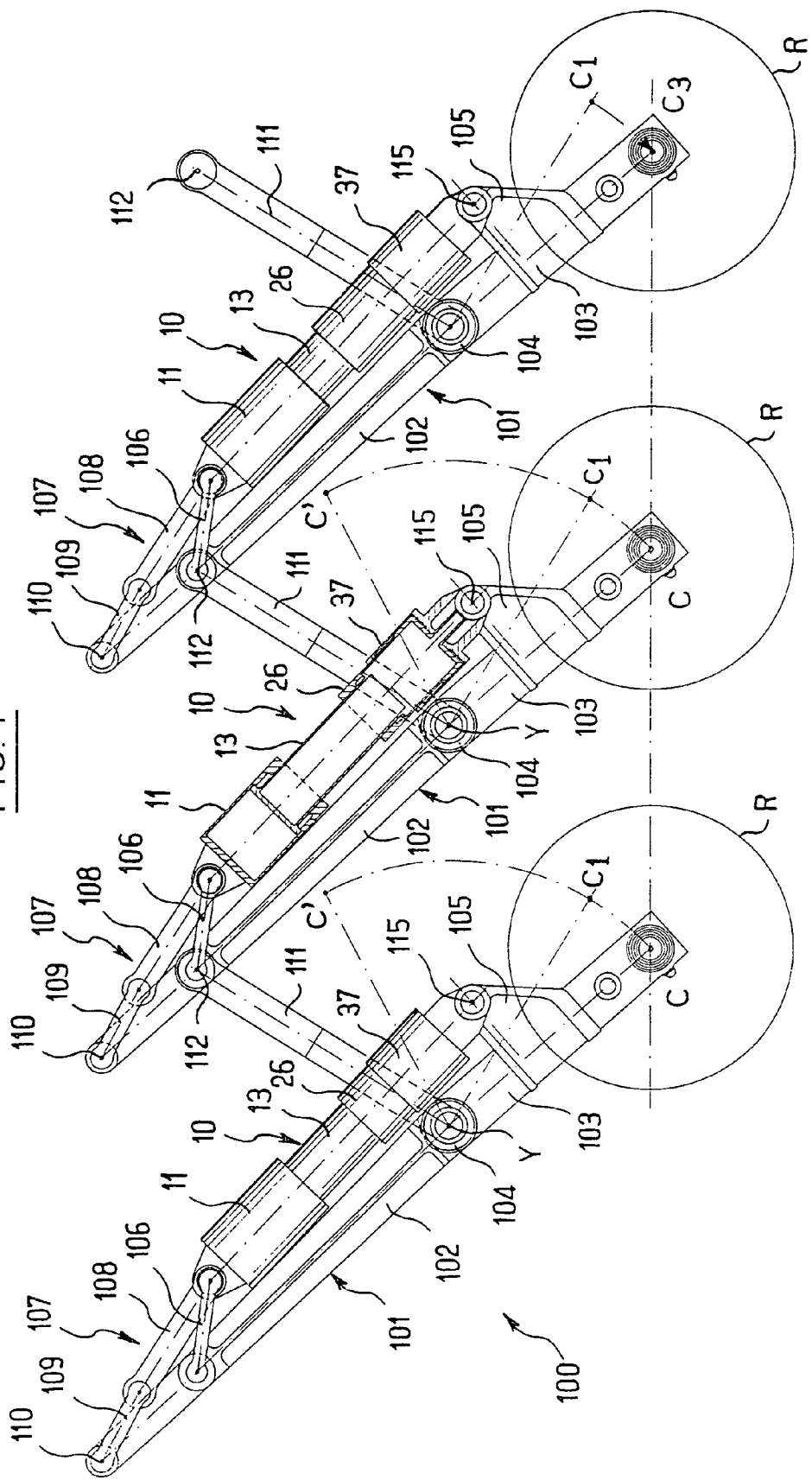
FIG. 4 is a view analogous to the preceding figures showing the position in which the rear leg has its shock absorber maximally lengthened, thus showing the maximally-extended position for this landing gear leg.

In FIG. 4, the rearmost leg has its damper 10 in its maximally-lengthened position.

In this position, there can be seen a length of rod-piston 13 that is much shorter than the maximum length as shown for the other legs, i.e. it can be seen that this length corresponds to the extent to which it penetrates under static load. However, a maximum length is visible for the secondary strut 26 which is then in its maximally-projecting position from the other strut 27. As a result of the damper being put into this maximally-lengthened position, the rocker beam 103 has pivoted clockwise, such that the center of its pair of wheels R has gone from the point $C_1$ corresponding to the extent to which the damper penetrates under static load to a point $C_3$ corresponding to the position in which the leg 101 concerned in its maximally-extended position.

It would naturally be advantageous to provide for the dampers 10 of the landing gear shown to have control circuits arranged to enable selective individual control or group control of the lengthening or shortening of said dampers. This would provide for extremely flexible actuation in the contraction or extension direction, possibly with control being in stages crossing a plurality of successive thresholds both when extending and when contracting.

Naturally, provision is also made for the dampers 10 of the landing gear to be dimensioned so as to guarantee predetermined ground clearance for the airplane when the legs 101 in a given row are all in a maximally-contracted position, by using associated abutments as shown in FIG. 3 for the rearmost leg only.

It is thus easy to control a change in the attitude of an airplane very accurately by simultaneously controlling all of the dampers concerned, e.g. with a single leg being shortened when there is a need to change a tire, or a single front leg being shortened when it is desired to facilitate steering maneuvers.

Provision may optionally be made for the hydraulic locking members of the dampers to be controllable simultaneously so that on being opened they enable the airplane to settle naturally under the effect of the static load exerted by said airplane.

The invention is not limited to the embodiments described above, but on the contrary covers any variant using equivalent means to reproduce the essential characteristics specified above.

In particular, it is possible to use electrically-driven generation for controlling contraction, extension, and locking.

What is claimed is:

1. A damper (10) for an airplane landing gear leg, the damper comprising a main strut (11) and a rod-piston (13) having one end mounted to slide in said main strut along the axis (X) thereof, said rod-piston (13) co-operating with the main strut (11) to define a main hydraulic fluid chamber (15) and an annular hydraulic fluid chamber (16) communicating with said main chamber via an associated diaphragm (18), and said rod-piston (13) presenting internally two adjacent chambers (19, 20) isolated from each other by a separator piston (21), one of the adjacent chambers (19) being a hydraulic fluid chamber which communicates with the main chamber (15) via an associated diaphragm (17), and the other of the adjacent chambers (20) being a pressurized gas chamber, the damper further comprising a first secondary strut (26) having one end mounted to slide telescopically on the other end of the above-mentioned rod-piston (13), co-operating with an end wall (25) of said rod-piston to define a first secondary hydraulic fluid chamber (30) which is closed by an associated hydraulic locking member (36), and a first annular secondary hydraulic fluid chamber (31) which is connected to an associated control circuit (34, 35) thus enabling the total length of the damper (10) to be shortened in order to allow the landing gear leg to contract, and a second secondary strut (37) mounted to slide telescopically on the other end of the first secondary strut (26), co-operating with an end wall (28) of said first secondary strut to define a second secondary hydraulic fluid chamber (39) which is closed by an associated hydraulic locking member (46), and a second annular secondary hydraulic fluid chamber (40) which is connected to an associated control circuit (44, 45), thus enabling the total length of the damper (10) to be lengthened in order to extend the landing gear leg.

2. A damper according to claim 1, wherein the first secondary hydraulic fluid chamber (30) is separated from the pressurized gas chamber (20) by an intermediate partition forming the end wall (25) of the rod-piston (13).

3. A damper according to claim 1, wherein, in the maximally-shortened position of said damper due to the rod-piston (13) penetrating into the first secondary strut (26), said first secondary strut (26) comes into abutment against the main strut (11), thereby guaranteeing predetermined ground clearance (d) for the airplane in the maximally-contracted position of the corresponding landing gear legs.

4. A damper according to claim 1, wherein, in the maximally-lengthened position of said damper due to the first secondary strut (26) projecting out from the second secondary strut (37), an inside shoulder (41) of said second secondary strut comes into abutment against an outside shoulder (42) of said first secondary strut, thereby guaranteeing a constant extended position for the landing gear leg concerned.

5. A damper according to claim 1, wherein, each of the control circuits associated with the first and second annular secondary hydraulic fluid chambers (31; 40) comprises an individually-actuatable solenoid valve (35; 45).

6. A retractable landing gear for an airplane, the landing gear comprising a plurality of legs (101) arranged one behind another to form, in the gear-down position, a row that is parallel to the longitudinal midplane of the airplane, each leg (101) comprising a structural part (102) rigidly secured to an airplane structure, a rocker beam (103) hinged to the bottom end of said structural part so that said rocker beam is movable in a vertical plane together with a pair of wheels (R), and a damper interposed between an appendix (105) of the rocker beam and at least one movable element (106, 108) forming part of the landing gear control rodding, wherein the damper of each leg (101) is a damper (10) according to claim 1, enabling a pair of wheels (R) to be raised or lowered selectively in order to cause said leg to contract or to be extended, while the airplane is stationary or moving slowly on the ground.

7. Landing gear according to claim 6, wherein the dampers (10) of said landing gear have control circuits (34, 35, 44, 45) arranged to enable the lengthening or shortening of said dampers to be controlled either as a group or else selectively and individually.

8. Landing gear according to claim 7, wherein the dampers (10) of said landing gear are dimensioned to guarantee predetermined ground clearance for the airplane in the maximally-contracted position of the legs (101) in a given row, by means of an associated thrust abutment (12.1, 27.1)

* * * * *